UNITED STATES PATENT OFFICE.

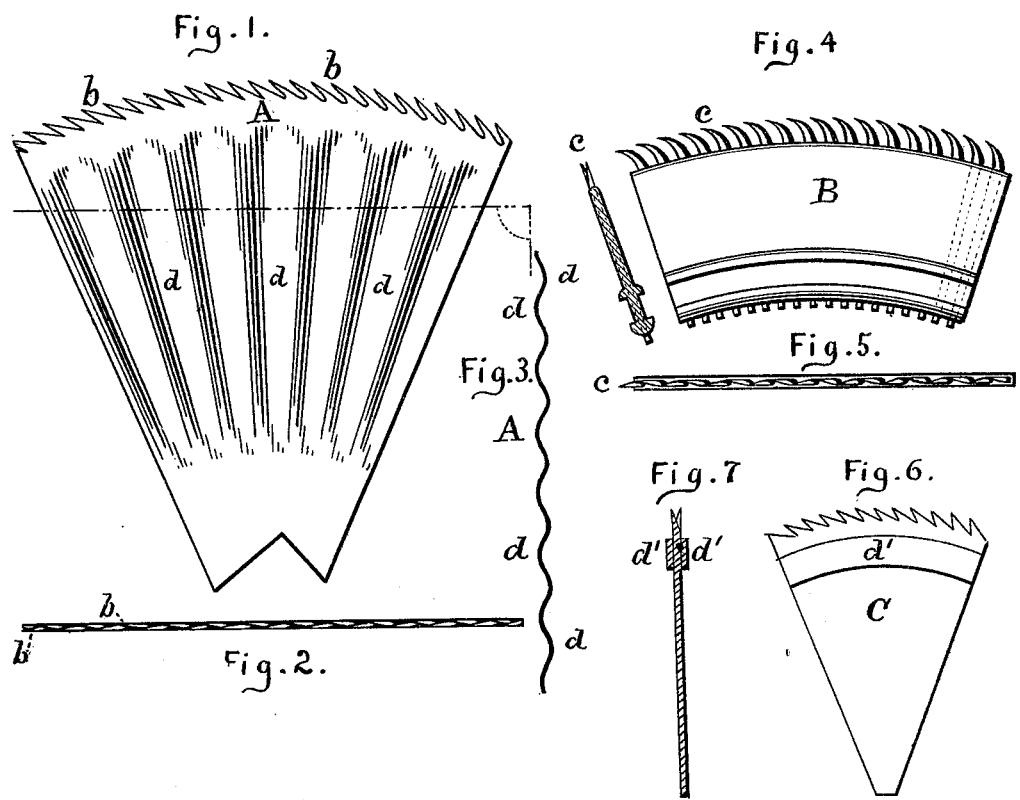

CHARLES F. SCATTERGOOD, OF ALBANY, NEW YORK.

IMPROVEMENT IN COTTON-GIN SAWS.

Specification forming part of Letters Patent No. 180,793, dated August 8, 1876; application filed September 25, 1875.

*To all whom it may concern:*

Be it known that I, CHARLES F. SCATTERGOOD, of Albany, in the county of Albany and State of New York, have invented certain new and useful Improvements in Cotton-Gin Saws and Cotton Gin Cylinders; and I do hereby declare that the following is a full, clear, and exact description thereof, which will enable others skilled in the art to which it pertains to make and use the same, reference being had to the accompanying drawings, and to the letters of reference marked thereon, which form a part of this specification, in which drawings—

Figures 1, 4, and 6 are side views of portions of several well-known forms of cotton-gin saws. Figs. 2 and 5 are edge views, showing the set of the saw-teeth. Fig. 3, a portion of Fig. 4, and Fig. 7 are sectional views of the several kinds of saws shown.

My invention relates to the teeth of cotton-gin saws; and consists of such saws having teeth set or staggered, to enable them to seize more readily the cotton-fibers, as hereinafter more fully described.

A is a portion of a cotton-gin saw, provided with teeth $b$, and B represents a portion of a needle-tooth saw, having sharp-pointed wire teeth $c$, which teeth $b$ and $c$ are set or staggered, as shown in Figs. 2 and 5, and in the sectional part of Fig. 4, and in Fig. 7 of the drawings.

These teeth, set as described and shown, will more readily seize the cotton-fibers, and each tooth will hold a greater quantity, and thus injure less cotton in the process of ginning, than the ordinary unset teeth; and a cotton-gin provided with saws having the teeth set as described will do cleaner and more rapid work, and will obtain more cotton from the seed, than will a machine with the ordinary unset teeth, thus making an important gain in the crop already grown.

The teeth of any ordinary cotton-gin saw may be set or staggered as described; but the well-known saw-plates, stiffened by corrugations $d$ or ribs $d'$, as shown in the drawings, are preferred, because such saws are less liable to spring, and the teeth are thereby protected from injury.

What I claim as new in cotton-gins, and desire to secure by Letters Patent, is—

A cotton-gin saw having teeth set or staggered, substantially as and for the purposes described.

In testimony that I claim the foregoing as my own invention I affix my signature in presence of two witnesses.

CHAS. FOURIER SCATTERGOOD.

Witnesses:
    H. V. SCATTERGOOD,
    W. G. SCATTERGOOD.